Oct. 28, 1930.　　　　I. PECHAN　　　　1,780,039
TRIPOD HEAD
Filed April 5, 1929
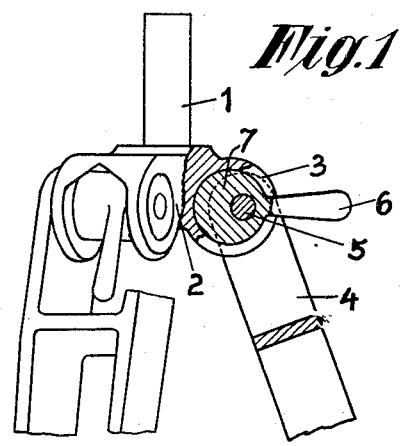
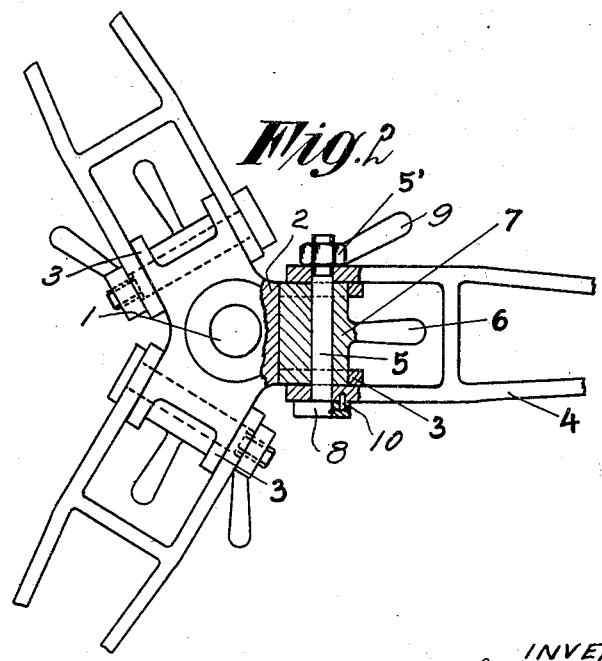
INVENTOR
J. Pechan,
BY
ATTYS.

Patented Oct. 28, 1930

1,780,039

UNITED STATES PATENT OFFICE

IGNAZ PECHAN, OF VIENNA, AUSTRIA, ASSIGNOR TO THE CZECHOSLOVAK COMPANY: C. P. GOERZ, OPTISCHE ANSTALT AKTIENGESELLSCHAFT, AKCIOVA SPOLECNOST K. P. GOERZ, OPTICKY USTAV, OF BRATISLAVA, CZECHOSLOVAKIA

TRIPOD HEAD

Application filed April 5, 1929, Serial No. 352,820, and in Germany April 14, 1928.

The invention consists in a particularly suitable construction of the tripod head for instruments of all kinds which before use have to be so adjusted by water level, plumb or the like, that one of the main axes of the instrument is exactly adjusted to the vertical or to the horizontal.

This so called horizontalizing of the instrument mounted on the tripod head is brought about according to the invention by journalling, by means of an eccentric, the pins of one or more tripod feet in the journals of the tripod head, such pins being preferably provided each with a locking screw in the manner known per se so that by turning the eccentrics the supporting element of the instrument is horizontalized owing to the variation of its inclination to the horizontal.

In the drawing an embodiment of the subject matter of the invention is shown by way of example, Fig. 1 being an elevation partly in section of the eccentric journalling of the feet and Fig. 2 a plan view partly in section of the same.

The tripod head 2 provided with the vertical supporting journal pin 1 has three bifurcated lugs 3 set at angles of 120° and cast integral with it for mounting thereon the tripod feet 4 bifurcated at their top ends; each of the said bifurcated top ends of the tripod feet carries a pin 5 locked against rotation in the associated tripod foot by any suitable means, such for instance as a pin 10 engaging both the tripod foot and the head 8 of the pin 5. On this pin is rotatably mounted an eccentric 7 provided with a handle 6. Each of these eccentrics is at the same time rotatably mounted in a suitable bore of the bifurcated lugs 3 of the tripod head, so that by turning an eccentric by operating the handle the lug 3 supported by such eccentric may be raised or lowered whereby the axis of the supporting journal pin 1 is inclined towards or away from the side of the handle operated.

For adjusting to the vertical the axis of the supporting journal pin (horizontalizing the instrument supported) such eccentric journalling of the tripod head only on two tripod feet pins would be required. However a more extensive possibility of adjustment results when all three pins of the tripod feet are provided with such adjusting eccentrics.

For locking the eccentrics in the position to which they have been adjusted the pins 5 locked against rotation in the bifurcated top ends of the tripod feet are provided each on the one hand with a head 8 and on the other hand with a screw thread on which a nut 5' provided with a handle 9 is screwed by screwing fast this nut whereby all the parts between it and the said pin head are firmly locked in position.

What I claim is:

1. A tripod comprising three feet, a head, a support mounted on such head and means for pivotally connecting said head to each of the feet of the tripod, said means comprising in at least two of the feet of the tripod a pin passing through parts fixed on a tripod foot and parts fixed on the tripod head, an eccentric mounted on such pin and journalled in one of the parts to be connected by such pin, means for turning the said eccentric and means for locking such eccentric in position.

2. A tripod comprising three feet, a head, a support mounted on said head, and means for pivotally connecting such head to each of the feet of the tripod, said means comprising in at least two of the feet of the tripod a pin passing through parts fixed on a tripod foot and parts fixed on the tripod head and locked against rotation in the tripod feet, an eccentric mounted on such pin and journalled in the part of the tripod head to be pivotally connected to the associated tripod foot, means for turning the said eccentric and means for locking such eccentric in position.

3. A tripod comprising three feet, a head, a support mounted on such head and means for pivotally connecting such head to each of the feet of the tripod, such means comprising in at least two of the feet of the tripod, a pin passing through parts fixed on a tripod foot and parts fixed on the tripod head, an eccentric mounted on such pin and journalled in one of the parts to be connected by such pin, means for turning the said eccentric and means for locking such eccentric in position, such means comprising a locking nut on the said pin.

In testimony whereof I affix my signature.

IGNAZ PECHAN.